United States Patent
Ganu et al.

(10) Patent No.: US 9,748,771 B2
(45) Date of Patent: Aug. 29, 2017

(54) PLUG ARRANGEMENTS FOR ALLEVIATING PEAK LOADS

(75) Inventors: Tanuja Hrishikesh Ganu, Bangalore (IN); Shivkumar Kalyanaraman, Bangalore (IN); Devasenapathi Periagraharam Seetharamakrishnan, Bangalore (IN); Liyanage Chandratilak De Silva, Negara (BN)

(73) Assignees: International Business Machines Corporation, Armonk, NY (US); Universiti Brunei Darussalam (BN)

( * ) Notice: Subject to any disclaimer, the term of this patent is extended or adjusted under 35 U.S.C. 154(b) by 114 days.

(21) Appl. No.: 13/445,645

(22) Filed: Apr. 12, 2012

(65) Prior Publication Data

US 2013/0274945 A1    Oct. 17, 2013

(51) Int. Cl.
*G06F 1/26* (2006.01)
*H02J 3/14* (2006.01)
*H02J 3/32* (2006.01)

(52) U.S. Cl.
CPC . *H02J 3/14* (2013.01); *H02J 3/32* (2013.01); *H02J 2003/143* (2013.01); *Y02B 70/3225* (2013.01); *Y02B 70/3266* (2013.01); *Y04S 20/222* (2013.01); *Y04S 20/242* (2013.01)

(58) Field of Classification Search
None
See application file for complete search history.

(56) References Cited

U.S. PATENT DOCUMENTS

| | | | |
|---|---|---|---|
| 4,317,049 A | 2/1982 | Schweppe | |
| 6,181,985 B1* | 1/2001 | O'Donnell et al. | 700/295 |
| 7,010,363 B2* | 3/2006 | Donnelly et al. | 700/19 |
| 7,110,832 B2 | 9/2006 | Ghent | |
| 7,274,975 B2 | 9/2007 | Miller | |
| 2003/0178894 A1* | 9/2003 | Ghent | D06F 33/02 |
| | | | 307/140 |
| 2004/0244009 A1* | 12/2004 | Bak | G06F 9/4431 |
| | | | 719/315 |

(Continued)

FOREIGN PATENT DOCUMENTS

EP    1367385    5/2002

OTHER PUBLICATIONS

Williamson, Ian, et al., "Intelligent load control strategies utilising communication capabilities to improve the power quality of inverter based renewable island power systems", International Conference RES for Island, Tourism & Water, May 26-28, 2003, 8 pages, Centre for Renewal Energy Sources, Crete, Greece.

(Continued)

*Primary Examiner* — Sean Shechtman
(74) *Attorney, Agent, or Firm* — Ference & Associates LLC (57) ABSTRACT

Methods and arrangements for load-shifting time deferrable devices. An electrical load scheduling mechanism is provided, and this is placed in communication with an appliance. Electrical grid load conditions are assessed, and delivery of electrical power to the appliance is scheduled via the electrical load scheduling mechanism. The scheduling includes altering a predetermined delivery of electric power to the appliance based on the assessed electrical grid conditions.

21 Claims, 7 Drawing Sheets

(56) References Cited

U.S. PATENT DOCUMENTS

| | | | |
|---|---|---|---|
| 2004/0255307 A1* | 12/2004 | Irudayaraj | H04L 67/1095 719/328 |
| 2008/0077710 A1* | 3/2008 | Kouvelas | H04L 12/1854 709/250 |
| 2008/0114499 A1* | 5/2008 | Hakim et al. | 700/291 |
| 2009/0062967 A1* | 3/2009 | Kressner et al. | 700/286 |
| 2010/0017249 A1* | 1/2010 | Fincham | B60L 3/12 705/412 |
| 2010/0070101 A1 | 3/2010 | Benes et al. | |
| 2010/0138363 A1 | 6/2010 | Batterberry et al. | |
| 2010/0174667 A1* | 7/2010 | Vitale et al. | 705/412 |
| 2011/0022242 A1 | 1/2011 | Bukhin et al. | |
| 2011/0106328 A1 | 5/2011 | Zhou et al. | |
| 2011/0202198 A1 | 8/2011 | Venkatakrishnan et al. | |
| 2012/0016532 A1 | 1/2012 | Spicer et al. | |
| 2012/0049639 A1* | 3/2012 | Besore et al. | 307/97 |
| 2013/0096726 A1* | 4/2013 | Lyren | H02J 3/14 700/291 |

OTHER PUBLICATIONS

"Smart Plug Strips: Draft Report", ECOS, Jul. 22, 2009, 32 pages, available at http://efficientproducts.org/reports/smartplugstrip/Ecos-Smart-Plug-Strips-DRAFT-Jul2009-v2x.pdf.

Lin, Jessica, et al., "A Symbolic Representation of Time Series, with Implications for Streaming Algorithms," DMKD'03 Proceedings of the 8th ACM SIGMOD Workshop on Research Issues in Data Mining and Knowledge Discovery, Jun. 13, 2003, San Diego, California, USA, pp. 2-11, ACM, New York, New York, USA.

\* cited by examiner

Input: $S_t$, $E_t$, $\tau$, $d$, $V_u$, $V_l$, $f_l$
1:   $n = (E_t - S_t)/\tau$, $D = d/\tau$, $t \leftarrow 0$
2:   if $t \geq n - D$ goto step 15
3:   $w_c \leftarrow \dfrac{n-t}{D}$           % set the contention window
4:   $r \leftarrow$ randint $(0, w_c, -1)$
5:   $t \leftarrow$ wait $(r, t)$         % wait for $r$ time slots
6:   $(v_c, f_c) \leftarrow$ sense     % sense the grid voltage and frequency
7:   if $(v_c < V_l)$ then
8:     $p \leftarrow 0$
9:   else if $(v_c > V_u)$ then
10:     $p \leftarrow 1$
11:   else
12:     $p \leftarrow (v_c - V_l)/(v_u - V_l)$
13:   end if
14:   if rand $(0, 1) < p$ and $f_c < f_l$ then
15:     switch ( ON )   % acquire service with probability $p$
16:     $t \leftarrow$ safewait $(D, t)$
17:     switch ( OFF ); exit
18;   else
19:     $t \leftarrow$ wait $(1, t)$ ; goto step 2
20:   end if

PLUG ARRANGEMENTS FOR ALLEVIATING PEAK LOADS

BACKGROUND

Generally, it is recognized that demand for electrical energy is not constant; there are certain hours of each day when demand "peaks" at levels considerably higher than the remainder of the day. If utility companies buy energy during the peak demand periods, they normally need to pay a premium for transferring energy when the transmission lines are congested. Flat-rate electric tariffs shield most consumers from fluctuations in energy costs, especially those caused by buying energy supplies on short notice. Utilities, however, are not insulated from these fluctuations. When the market rate for electricity rises above the approved retail rate, utilities are caught in the middle, which can be financially disastrous. Utilities can't simply pass price increases along to consumers without regulatory approval.

Further, in some countries there is a significant peak load shortage while peak load continues to grow faster than average usage. It has come to be recognized that it is not cost-effective for utilities to implement a comprehensive smart-grid infrastructure to tackle peak load problems.

As things stand, power utilities generally predict a demand pattern throughout any particular day. Any supply-demand imbalance thus normally arises due to inaccuracies in the prediction, or unscheduled changes in supply (e.g., a power station fault) and/or demand. Such imbalance thus puts the grid in a critical state.

To address such issues, the shifting of deferrable loads has been contemplated and addressed. Thus, deferrable loads (e.g., as might be encountered with electric vehicles, water heaters, energy storage devices, and washing machines) can be shifted from on-peak times to off-peak times to reduce peak load dramatically. Also, deferrable loads can be interrupted for a short time during situations of supply-demand imbalance. Some utilities have also proposed the use of differential tariff plans to encourage and incentivize consumers for load shifting. However, it can be appreciated that the success of a load-shifting plan depends upon the consumer's responsiveness and compels either manual intervention or some type of sophisticated load scheduling technique. While the former remedy can be unwieldy and inefficient, the latter has hitherto proven to be elusive in any practical and cost-effective sense.

BRIEF SUMMARY

In summary, one aspect of the invention provides a method comprising: providing an electrical load scheduling mechanism; placing the electrical load scheduling mechanism in communication with an appliance; assessing electrical grid load conditions; and scheduling delivery of electrical power to the appliance via the electrical load scheduling mechanism; the scheduling comprising altering a predetermined delivery of electric power to the appliance based on the assessed electrical grid conditions.

Another aspect of the invention provides an apparatus comprising: at least one processor; and a computer readable storage medium having computer readable program code embodied therewith and executable by the at least one processor, the computer readable program code comprising: computer readable program code configured to accommodate an electrical load scheduling mechanism; computer readable program code configured to placing the electrical load scheduling mechanism in communication with an appliance; computer readable program code configured to assess electrical grid load conditions; computer readable program code configured to schedule delivery of electrical power to the appliance via the electrical load scheduling mechanism; and computer readable program code configured to schedule altering a predetermined delivery of electric power to the appliance based on the assessed electrical grid conditions.

An additional aspect of the invention provides a computer program product comprising: a computer readable storage medium having computer readable program code embodied therewith, the computer readable program code comprising: computer readable program code configured to accommodate an electrical load scheduling mechanism; computer readable program code configured to placing the electrical load scheduling mechanism in communication with an appliance; computer readable program code configured to assess electrical grid load conditions; computer readable program code configured to schedule delivery of electrical power to the appliance via the electrical load scheduling mechanism; and computer readable program code configured to schedule altering a predetermined delivery of electric power to the appliance based on the assessed electrical grid conditions.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-5. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12' in FIG. 7. In accordance with an example embodiment, most if not all of the process steps, components and outputs discussed with respect to FIGS. 1-5 can be performed or utilized by way of a processing unit or units and system memory such as those indicated, respectively, at 16' and 28' in FIG. 7. In at least one embodiment of the invention, programming code in its entirety can be executed on a microcontroller embedded in a plug. However, it is also conceivable in at least one variant embodiment to employ another type of computer system arrangement to execute programming code, such as a server computer, a client computer, a node computer in a distributed network, or any combination thereof.

In accordance with at least one embodiment of the invention, there is broadly contemplated herein a simple and inexpensive mechanism for rescheduling deferrable high consuming loads while maintaining a desired or expected comfort level for the consumer. As such, a plug, as broadly contemplated herein, addresses power imbalance and peak load while accommodating adaptive scheduling, user preferences, grid sensing (frequency and voltage sensing), and decentralized scheduling.

In accordance with at least one embodiment of the invention, a smart plug works in a decentralized fashion to minimize computation and communication resource requirements as well as to avoid any single point of failure. Grid load condition is sensed in real-time, and grid peak load patterns and deferrable load usage pattern are learned based on historical data and information. A simple scheduling approach is implemented that shifts the loads to off-peak times and responds to sudden fluctuations while respecting consumer preferences.

In accordance with at least one embodiment of the invention, a plug with "smart" characteristics works merely by using grid signals (e.g., frequency, voltage, current and phase angle, etc.). As an intelligent and self-adaptive instrument, it learns consumption profiles, grid conditions, such as peak times and supply-demand imbalance situations, and other external parameters, such as start times and durations of scheduled power outages. Deferrable load can automatically be rescheduled to off-peak times while respecting the consumer preferences, thus obviating the need for any manual switching or for reconfiguration in response to changes in the external conditions.

In accordance with at least one embodiment of the invention, a plug with smart characteristics can be a self-standing entity or can be integrated with an appliance (e.g., a water heater or washing machine). It works in a decentralized manner and realizes the peak reduction in a self-organized way. It does not require any new infrastructure, senses grid conditions in real-time and thereupon dynamically responds to situations of power imbalance.

Figure 1:
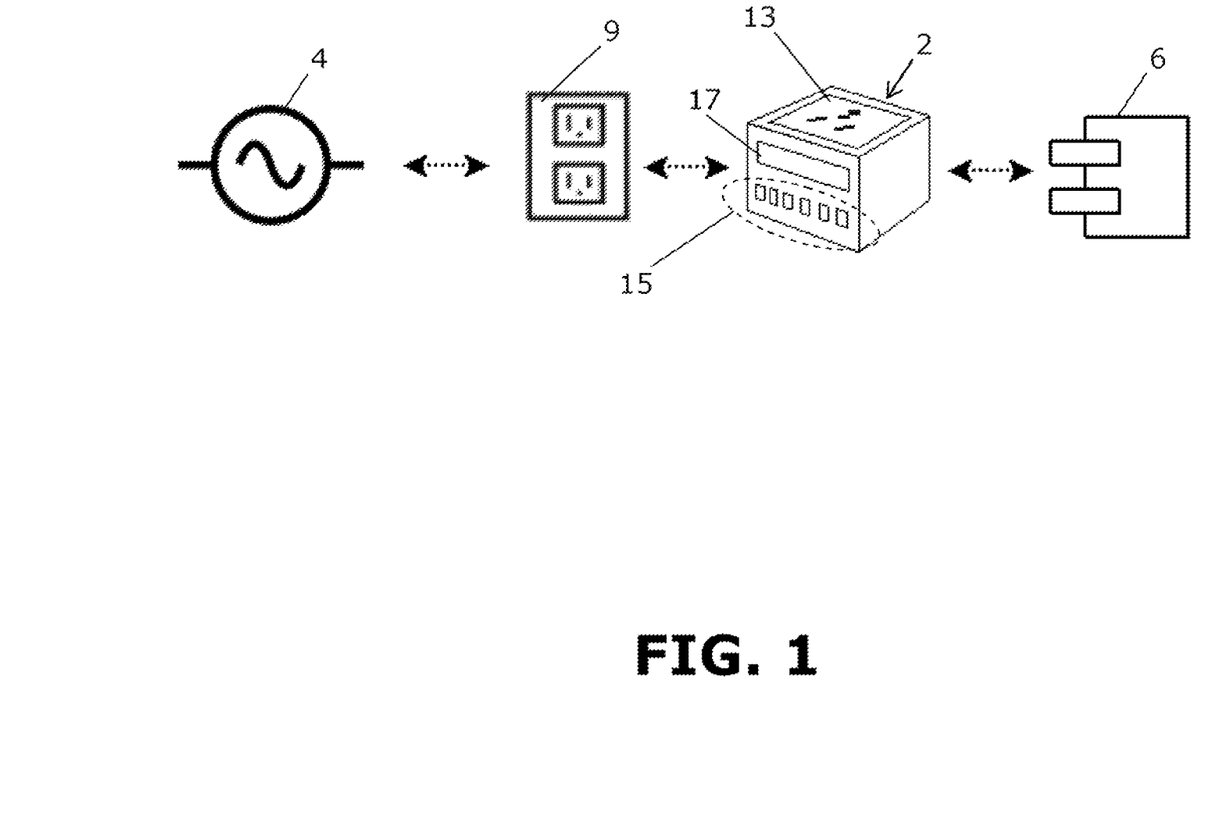
FIG. 1 schematically illustrates a plug with smart characteristics, and components with which it is in communication.

As such, and in accordance with at least one embodiment of the invention, as shown in FIG. 1, a plug (with smart characteristics) 2 can be interposed between a power supply 4 and appliance 6 as an entity which is independent and separable from appliance 6. Thus, as shown, appliance 6 can plug into the plug 2, which itself can then be plugged into a wall socket 9, itself in communication with power supply 4. Thus, instead of plugging in the appliance 6 directly to wall socket 9, plug 2 serves as the receptacle for a plug from appliance 6 and itself is plugged in to socket 9. For its part, plug 2 includes a receptacle 13 to accommodate a plug from appliance 6, user controls 15 for a user/consumer to set parameters for scheduling a deferrable load and a display 17 for providing a readout of entered values (and/or other information) as needed. In a manner to be better understood and appreciated herebelow, plug 2 serves an intermediary role by sensing characteristics of power supply 4 and thereupon adaptively delivering a deferrable load to appliance 6 in accordance with any of a variety of determining factors.

Figure 2:
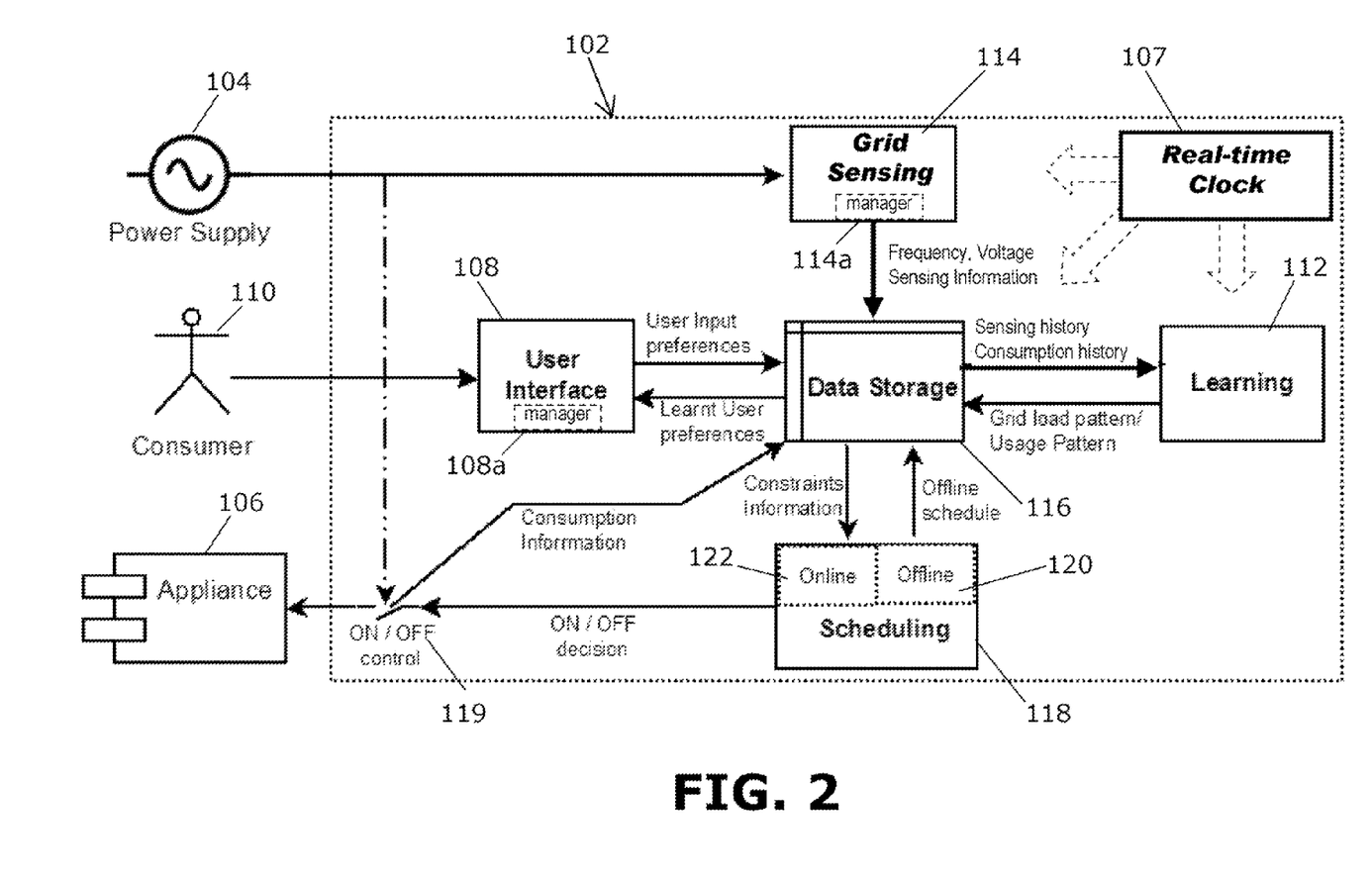
FIG. 2 schematically illustrates a plug with smart characteristics, and related components.

In accordance with at least one embodiment of the invention, FIG. 2 shows a plug arrangement, with a plug 102 (with smart characteristics) in communication with a power supply 104 and appliance 106. The plug 102 may be a self-standing entity that is functionally separate from both the power supply 104 and appliance 106 (and thus functionally interposed between those latter two entities), or could be functionally integrated with appliance 106. Included in plug 102 is a real-time clock 107 that can be integrated with any and all of several constituent modules of plug 102 in order to readily provide time data to such modules for the benefit of carrying out time-based functions.

In accordance with at least one embodiment of the invention, a user input interface 108 is mounted on the plug 102 and is provided for a user or consumer 110 to input information related to external parameters, e.g., time windows for the availability of other, e.g., alternative or renewable energy sources or load shedding etc. (If, indeed, other energy sources such as alternative/renewable energy sources available at certain times [e.g., if solar power is available in the daytime], the plug 102 could serve to schedule a deferrable load to such a time so as to avoid drawing power from the conventional grid.) User interface 108 may include controls (e.g., buttons or a touchpad) that are directly accessible to the consumer 110 (e.g., at an exterior surface of plug 102), integrated or in communication with a dedicated user interface manager 108a. Manager 108a, then can be used to communicate with data storage 116 (described further below) to input user preferences or validate user preferences learnt by a learning module 112 (described further below). User interface 108 can also incorporate an override switch to permit a consumer 110 to override any decisions or computations of the "smart" plug.

In accordance with at least one embodiment of the invention, user interface manager 108a accepts three user-specified constraints: earliest start time (the earliest time at which an appliance can be switched on); latest end time (the latest time at which an appliance needs or is desired to finish running); and duration (a duration over which an appliance needs or is desired to be powered). For instance, if a consumer 110 leaves his/her residence at about 8:00 AM, he or she may specify constraints wherein an insulated water heater must be run for 30 minutes between 4:00 AM and 7:00 AM.

In accordance with at least one embodiment of the invention, a grid sensing module 114 is provided to sense the voltage and frequency of a power grid which supplies power via power supply 104. As such, and in a manner to be elaborated upon below, the line voltage and frequency can represent good indicators of the current grid load and supply-demand imbalance respectively, and module 114 retrieves frequency and voltage information at predetermined times or time intervals (e.g., once per minute). Accordingly, grid sensing module 114 may include frequency and voltage sensors that are integrated or in communication with a dedicated data manager 114a. Manager 114a, then, can send sensed information or data to data storage 116.

Figure 3:
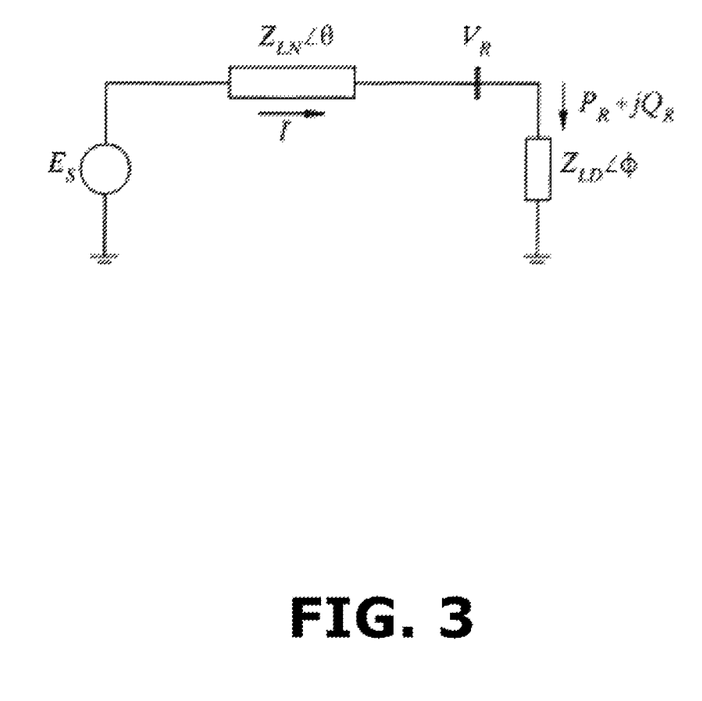
FIG. 3 illustrates a simplified power system in conveying aspects of voltage and frequency measurement.
Figure 4:
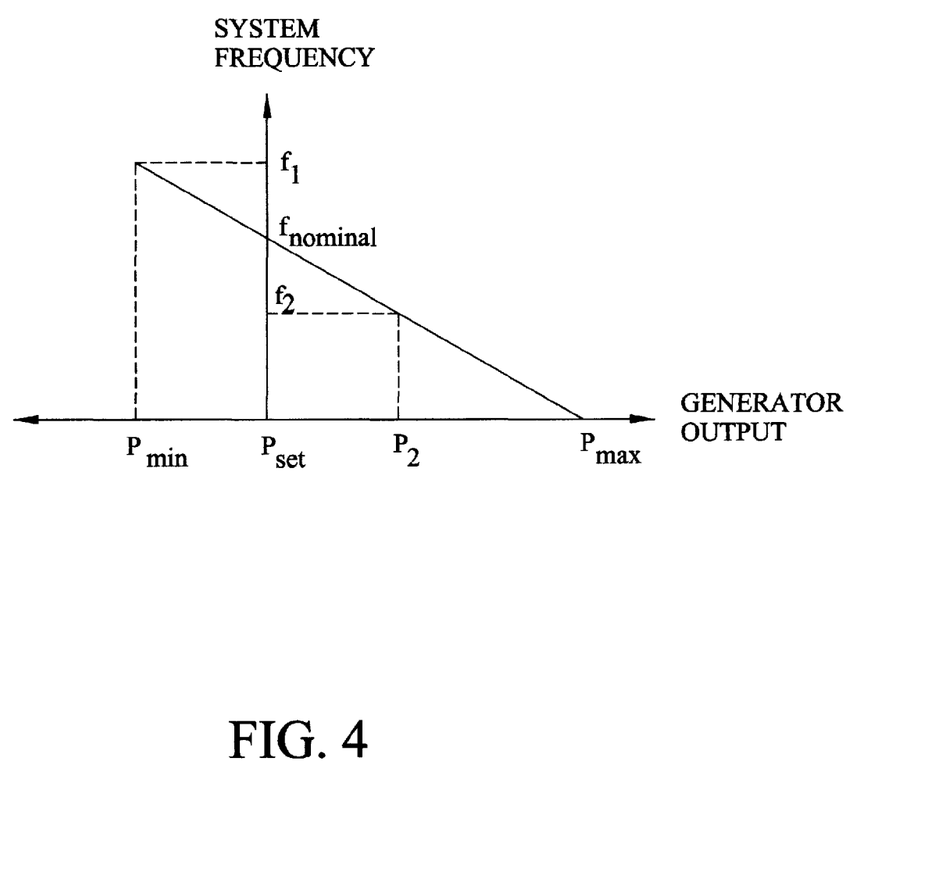
FIG. 4 graphically illustrates load-frequency control characteristics in conveying aspects of voltage and frequency measurement.

In accordance with at least one embodiment of the invention, grid sensing module 114 may sense line voltage and frequency of the electric grid, through power supply 104, in accordance with some principles of power systems lending themselves to this capability. As such, FIG. 3 illustrates a simplified power system in conveying aspects of voltage and frequency measurement, in accordance with an illustrative example in the context of at least one embodiment of the invention. As shown in FIG. 3, a load is connected to a generator using a transmission line. $\tilde{E}_S$ is the generator voltage, $\tilde{V}_R$ is the load voltage, $\tilde{Z}_{LN}$ is the transmission line impedance, and $\tilde{Z}_{LD}$ is the load impedance (wherein all quantities are vectors). It can now be illustrated as to how the magnitude of load voltage $\tilde{V}_R$ decreases with increasing load.

In accordance with the illustrative example in the context of at least one embodiment of the invention, as shown in FIG. 3, the current flowing through the line and load, $\tilde{I}$, is given by $$\tilde{I} = \frac{\tilde{E}_S}{\tilde{Z}_{LN} + \tilde{Z}_{LD}},$$

where $\tilde{Z}_{LN} = Z_{LN} \angle \theta = Z_{LN}\cos\theta + jZ_{LN}\sin\theta$ and $\tilde{Z}_{LD} = Z_{LD} \angle \phi = Z_{LD}\cos\phi + jZ_{LD}\sin\phi.$ Here, $\theta$ is the phase angle between reactive and resistive components of the line impedance while $\phi$ is the phase angle between the load current and voltage. Next, the magnitude of current I is given by $$I = \frac{E_S}{\sqrt{(Z_{LN}\cos\theta + Z_{LD}\cos\phi)^2 + (Z_{LN}\sin\theta + Z_{LD}\sin\phi)^2}}$$

Therefore, the magnitude of load voltage $V_R$ is:

$$V_R = Z_{LD} \times I \qquad (1)$$

$$= \frac{Z_{LD} \times E_S}{\sqrt{(Z_{LN}\cos\theta + Z_{LD}\cos\phi)^2 + (Z_{LN}\sin\theta + Z_{LD}\sin\phi)^2}}$$

Since, in accordance with the illustrative example in the context of at least one embodiment of the invention, as shown in FIG. 3, the source voltage $E_S$ and transmission line impedance $Z_{LN}\angle\theta$ are generally constant, the load voltage $V_R$ is essentially a function of the magnitude of load impedance $Z_{LD}$ and the power factor $\cos\phi$. Generally, to minimize reactive power consumption, appliances are usually designed to have a high power factor (e.g., 0.9 to 1). Thus, from Equation (1), it can be seen that the load voltage $V_R$ is dominated by the magnitude of load impedance $Z_{LD}$. As the load increases (i.e., as impedance decreases), the load voltage $V_R$ decreases and vice versa. Therefore, as the collective load on the grid increases, the corresponding voltage drop can be sensed at households.

In accordance with at least one embodiment of the invention, grid sensing module 114 (FIG. 2) can readily serve to detect supply-demand imbalance by sensing grid frequency. Particularly, grid frequency is conventionally regarded as an indicator of imbalance between generation and demand. During imbalance, the output of each generator is automatically adjusted to meet the demand. This changes the system frequency according to the load-frequency characteristics of the generators, as graphically illustrated in FIG. 4. There, the plot shows that when generation is higher than $P_{set}$, that is, the generation needed to support a fixed load), then frequency drops. On the other hand, if generation is lower than $P_{set}$, frequency shoots up.

Returning now to FIG. 2, in accordance with at least one embodiment of the invention, the data manager 114a works as an interface between hardware sensors in module 114 and data storage 116. Grid sensing module 114 can sense the grid and read line voltage and frequency at regular time intervals. The sensed data can then be preprocessed by manager 114a and saved in the data storage 116 for later analysis by the learning module 112. Data manager 114a can compress sensed data prior to storage in data storage 116, via essentially any suitable data compression technique. (By way of an illustrative and non-restrictive example, one such technique, namely Piece-wise Aggregate Approximation [PAA], is discussed in J. Lin, E. Keogh, S. Lonardi, and B. Chiu, "A symbolic representation of time series, with implications for streaming algorithms", in *Proceedings of the 8th ACM SIGMOD workshop on Research issues in data mining and knowledge discovery*, DMKD '03, pages 2-11, New York, N.Y., USA, 2003.)

In accordance with at least one embodiment of the invention, data are compressed by segmenting a data sequence into fixed-length sections and calculating the mean value of these sections. Using the aforementioned PAA technique, given a time series V with n data points $V=\{v_1, v_2, \ldots, v_n\}$, the series is divided into segments of length w and creates a compressed series $V'=\{v_1', v_2', \ldots, v_m'\}$ of length $$m = \frac{n}{w},$$

where $$v_i' = \frac{1}{w} \sum_{j=(i-1)\times w+1}^{i\times w} v_j \, \forall \, i \in \{1 \ldots m\}.$$

Thus, the original data are compressed by a factor of w. The process here attempts to preserve similarities in the original time series and allows data analysis on the compressed representation instead of the original. Furthermore, the process supports stream processing that is beneficial in the resource-constrained environments such as encountered in the context of embodiments of the invention. By way of an illustrative and non-restrictive example, w can be 300, and this would provide sufficient dimensionality reduction and still retain granular information (5 minutes' interval) for further data analysis.

In accordance with at least one embodiment of the invention, data storage 116 comprises a small non-volatile memory that stores user input information, the frequency sensing history and the load consumption history. Any and all of such information may be used by learning module 112 and a scheduling module 118 (both discussed in more detail herebelow), while data storage 116 can also serve to store outputs from such modules.

In accordance with at least one embodiment of the invention, the learning module 112 imparts a self-adaptive capability to the plug 102. As such, it receives the frequency and voltage sensing history (for a predetermined previous time period, e.g., the previous week or previous month) from the data storage 116 and implements a data mining approach to identify the frequent off-peak time slots at which the load on the grid is low or frequency is stable. It can also be used in the bootstrap phase to learn the usage pattern (duration of use/frequent usage time slots, etc.) of the appliance 106 from the load consumption history. (The "bootstrap" phase would be an initial phase wherein the plug 102 only collects information such as voltage, frequency sensing and actual consumption history for the deferrable appliance 106, but does not execute a scheduling mechanism. It then can learn consumer preferences [e.g., earliest start time, latest end time, duration, etc.] self-adaptively, instead of taking this information from the consumer 110 directly.)

In accordance with at least one embodiment of the invention, learning module 112 adaptively learns the peak and off-peak periods in the grid by analyzing the voltage time series data collected and stored by the data manager 116. This information is then used to make scheduling decisions for the deferrable load (e.g., appliance 106) attached to or associated with plug 102.

In accordance with at least one embodiment of the invention, peak and off-peak periods are identified using two steps. First, stored data (e.g., PAA data) are transformed into a more meaningful symbolic representation (e.g. low, medium, or high load) by using an approach similar to Symbolic Aggregate Approximation (SAX) (as discussed in Lin et al., supra). The SAX representation is used when the time series exhibits a Gaussian distribution. In order to discretize or label a time-series with k alphabets, the SAX approach defines k−1 break points $\beta_1, \beta_2, \ldots, \beta_{k-1}$ in the Gaussian curve, producing k equal-sized areas under the curve. All values within an interval $(\beta_i, \beta_{i+1})$ are coded with a symbol corresponding to the interval. However, the voltage time series does not follow a Gaussian distribution and yields a distribution that is skewed towards one side. Therefore, domain knowledge can be employed wherein lower and upper break-points are identified using the following heuristic:

$$V_l = \min(V') + 0.3 \times (\max(V') - \min(V'))$$

$$V_u = \min(V') + 0.7 \times (\max(V') - \min(V'))$$

Thus, values $<V_l$ are classified as low load, those $>V_u$ are classified as high load, and those in between are classified as medium load. The resulting three-alphabet time series is regarded as a grid load pattern $\bar{V}$.

Continuing, in accordance with at least one embodiment of the invention, let $\bar{V}^1, \ldots, \bar{V}^l$ denote the grid load pattern for previous l days. In a second step, a median grid load-pattern $\hat{V}$ for a 24-hour period is computed by considering the grid-load pattern of the previous l days, where each entry at time t is the median of the previous l entries at the same time, that is, $\hat{v}_t = \text{median}_{i=1}^{l}(\bar{v}_t^i)$. All time periods of high load in the median grid load pattern are then regarded as peak periods, and the balance as off-peak periods.

In accordance with at least one embodiment of the invention, to ensure grid and appliance safety, scheduling power to appliances during periods of supply-demand imbalance is avoided. Unlike peak load, a supply-demand imbalance situation does not repeat periodically every day, and can come about from an unplanned or sudden change in demand or supply, detectable via detecting line frequency. Learning module 112 can thus learn a normal operating range of grid frequency by analyzing the sensed frequency data and identifying the imbalance as an outlier. By way of an illustrative and non-restrictive example, a 2-SD (two standard deviation) statistical test can be used to compute the thresholds of normal operating frequency. (Such a test is discussed, e.g., in V. Barnett and T. Lewis, *Outliers in Statistical Data*, John Wiley and Sons, 1994.)

Accordingly, in accordance with at least one embodiment of the invention, lower and upper operating thresholds, $f_l$ and $f_u$, can be computed as:

$$f_l = f_\mu - 2 \times f_\sigma$$

$$f_u = f_\mu + 2 \times f_\sigma,$$

where $f_\mu$ and $f_\sigma$ are the mean and standard deviation of sensed frequency data. Since mean and standard deviation can be computed in an online manner on a microcontroller, it would not be essential to store the entire frequency time series data. In order to reduce sensitivity to the extreme outliers that can change $f_\mu$ and $f_\sigma$, values beyond 3-SD can be discarded from computations. At every sampling time interval, grid sensing module 114 can sense the line frequency, $f_t$, and if it is less than $f_l$, it is identified as the situation of supply-demand imbalance. Otherwise, in the event of no sensed supply-demand imbalance, $f_l$ ends up being updated (i.e., recalculated) by way of $f_t$ (which itself ends up modifying $f_\mu$ and $f_\sigma$.

In accordance with at least one embodiment of the invention, the scheduling module 118 generally controls an on/off control 119 (e.g., in the form of a relay switch) for regulating the delivery of electrical power to appliance 106. As such, scheduling module 118 undertakes two sub-tasks of offline and online scheduling, respectively. For offline scheduling, a related sub-module 120 determines a feasible working time window for usage of the appliance 106, based on the constraints such as grid off-peak times (generated by learning module 112), user comfort preferences (provided by consumer 110 through user interface 108 or learnt by the learning module 112), appliance-related constraints (work duration, hold times, etc.) and external parameters (e.g., availability of renewable energy, load-shedding schedules, etc.). (Appliance-related constraints can be provided by consumer 110 via user interface 108, or learnt by learning module 112 in the aforementioned bootstrap phase.) Offline scheduling module 120 can thus output a schedule that is based on historic data and store it in data storage 116.

In accordance with at least one embodiment of the invention, the online scheduling module 122, on the other hand, responds to sudden or temporary changes or fluctuations in the earlier stated constraints. The frequency sensing module 114, for example, can provide information about the real-time load on the grid. If there are any sudden changes in the grid load conditions, the online scheduling module 122 would use a back-off approach to wait for a certain random number of time slots before switching on the appliance 106, while respecting user/consumer preferences (e.g., earliest start time, latest end time, etc.). This module 122 can also divide the working duration of the appliance 106 into multiple "chunks" (e.g., based on appliance specifications) and make a real-time decision considering the grid load at the start of every new chunk. Generally, a chunk is a block of time for which an appliance can be run or is desired to be run. For instance, if an electrical vehicle needs to be charged for several hours (e.g., 4 hours), the charging time can be broken up into 4 one-hour chunks or 8 half-hour chunks. As such, the chunk size can be decided upon by the end user 110 based on the deferrable load being worked with. Accordingly, if a chunk is too small, it would involve switching the ON/OFF control 119 too frequently, or if it is too large, it would miss out on addressing sudden changes in the grid during that chunk time. By way of examples, in case of a water heater, a single chunk of 30 minutes could be involved while, in the case of a washing machine, each of the rinse, spin cycles could be considered as separate chunks.

By way of further elaboration on the functioning of a scheduling module 122, in accordance with at least one embodiment of the invention, it can be appreciated that user-specified constraints as well as grid load conditions are taken into account. With an earliest start time $S_t$, latest end time $E_t$, and operational duration d of the appliance 106 obtained from consumer 110, the time between $S_t$ and $E_t$ can treated as divided into discrete time intervals each of width $\tau$. Let $n=(E_t-S_t)/\tau$ be the total number of time slots and $D=d/\tau$ be the number of contiguous slots needed by the appliance to finish work. (As such, loads here can be assumed to be non-splittable.) Three scheduling schemes may now be discussed, namely, off-peak scheduling, randomized scheduling, and probabilistic negative linear back-off (PNLB) scheduling.

In accordance with at least one embodiment of the invention, off-peak scheduling involves attempts to avoid peak time intervals to the extent possible. Inasmuch as peak time intervals can be learned adaptively by sensing the grid, a set of feasible start times to schedule the appliance would be all slots $\epsilon[S_t, E_t-D]$ excluding the set of peak time slots, where the appliance can be run for D continuous slots. A simple rule-based approach can then be employed wherein the appliance is scheduled at the earliest possible time slot that provides minimum overlap between the operational slots and the peak time slots.

In accordance with at least one embodiment of the invention, it can be recognized that while off-peak scheduling is useful and easy to implement, it may cause coordinated peaking during off-peak hours if several plugs with smart characteristics use the same rule to shift loads to common time slots. Randomized scheduling can thus be employed to distribute the loads uniformly across time. To this end, a plug 102 can pick a time uniformly at random among all slots $\epsilon[S_t, E_t-D]$, and schedule an appliance 106 at the start of the slot. Peak time slots may also be excluded if deemed necessary. Given a sufficient number of time slots, randomized scheduling can yield a uniform demand distribution across the off-peak slots and a commensurate reduction in the peak load.

In accordance with at least one embodiment of the invention, PNLB scheduling can serve to respond to fluctuations in demand or supply by considering the running load in the grid. Here, multiple plugs with smart characteristics can continuously sense the grid and attempt to acquire service in the presence of varying load. Particularly, voltage sensing can help determine if the load on the grid is low or high (i.e., if spare capacity is available or not). If the sensed voltage is sufficiently high, the appliance is switched on, otherwise the scheduling module 118 "backs off" and attempts to undertake, at a later time, a scheduling of power to the appliance 106. The length of each time slot $\tau$ can be assumed to be long enough so that if appliances are switched on or off in the previous time slot, the altered grid capacity can be sensed in the next slot.

Figure 5:
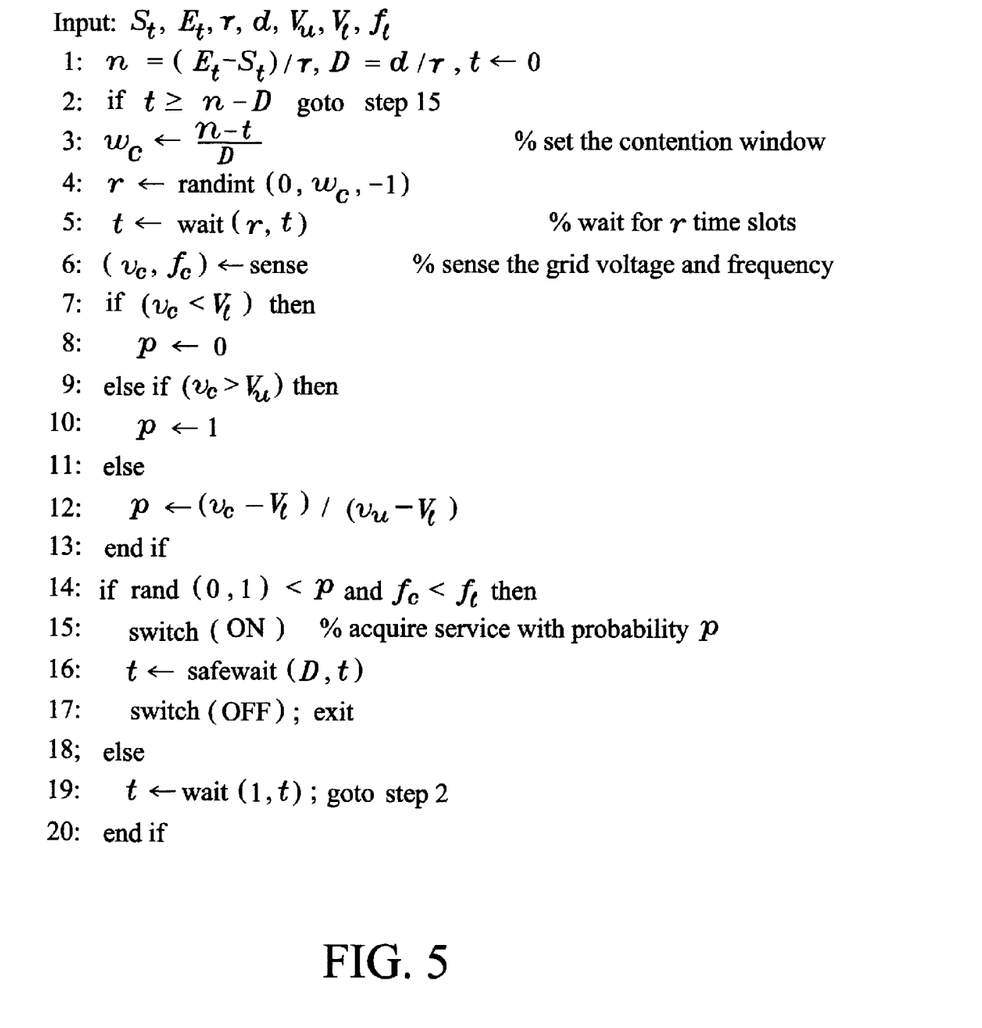
FIG. 5 presents pseudocode for a probabilistic negative linear back-off algorithm to be used by a scheduling module of a plug with smart characteristics.

In accordance with at least one embodiment of the invention, FIG. 5 provides pseudocode for probabilistic negative linear back-off (PNLB) algorithm to be used by a scheduling module 112. Here, contention between multiple plugs can be resolved in two steps. Firstly, if at time t, a plug 102 is to sense the grid via grid sensing module 114, it uses a contention window of length $w_c(t)$ and senses the grid at time slot t +r, in which r is chosen uniformly at random $\epsilon[0, w_c(t)-1]$. Thence, after sensing the current voltage $v_c$ during a time slot, plug 102 will switch on the appliance 106 with a probability p that is proportional to the currently available grid capacity. For their part, $w_c(t)$ and p are given by the following equation:

$$w_c(t) = \max\left\{1, \frac{E_t - t}{d}\right\},$$

$$p = \begin{cases} 0 & \text{if } v_c < V_l \\ 1 & \text{if } v_c > V_u \\ \dfrac{v_c - V_l}{V_u - V_l} & \text{otherwise,} \end{cases}$$

where $V_l$ and $V_u$ are the safe operating voltage thresholds (lower and upper, respectively) of the grid inferred from the sensed data. Thus, essentially, a first step mimics the behavior of the randomized scheduling scheme discussed above, and the second step ensures that plugs react to varying grid load whenever possible. In other words, in order to avoid a situation wherein multiple plugs sense the grid simultaneously and all find the voltage to be high enough (above $V_l$) to switch on their respective appliances, and thereby overload the grid above available capacity, a probabilistic approach is incorporated. In this approach, the probability p is proportional to the currently available grid capacity (calculated based on voltages). Plugs then switch on appliances with probability p, thus approximately p % of contending plugs switch on without overloading the grid excessively. If voltage is less than $V_l$ then p=0, and none of the plugs switch on their respective appliances.

In accordance with at least one embodiment of the invention, a plug can be tightly coupled with the appliance such as an electric vehicle or inverter (used for power backup). It can sense the existing electricity storage level in the appliance, determine the charging duration adaptively and schedule appliance charging based on the grid conditions and user specified time constraints.

Figure 6:
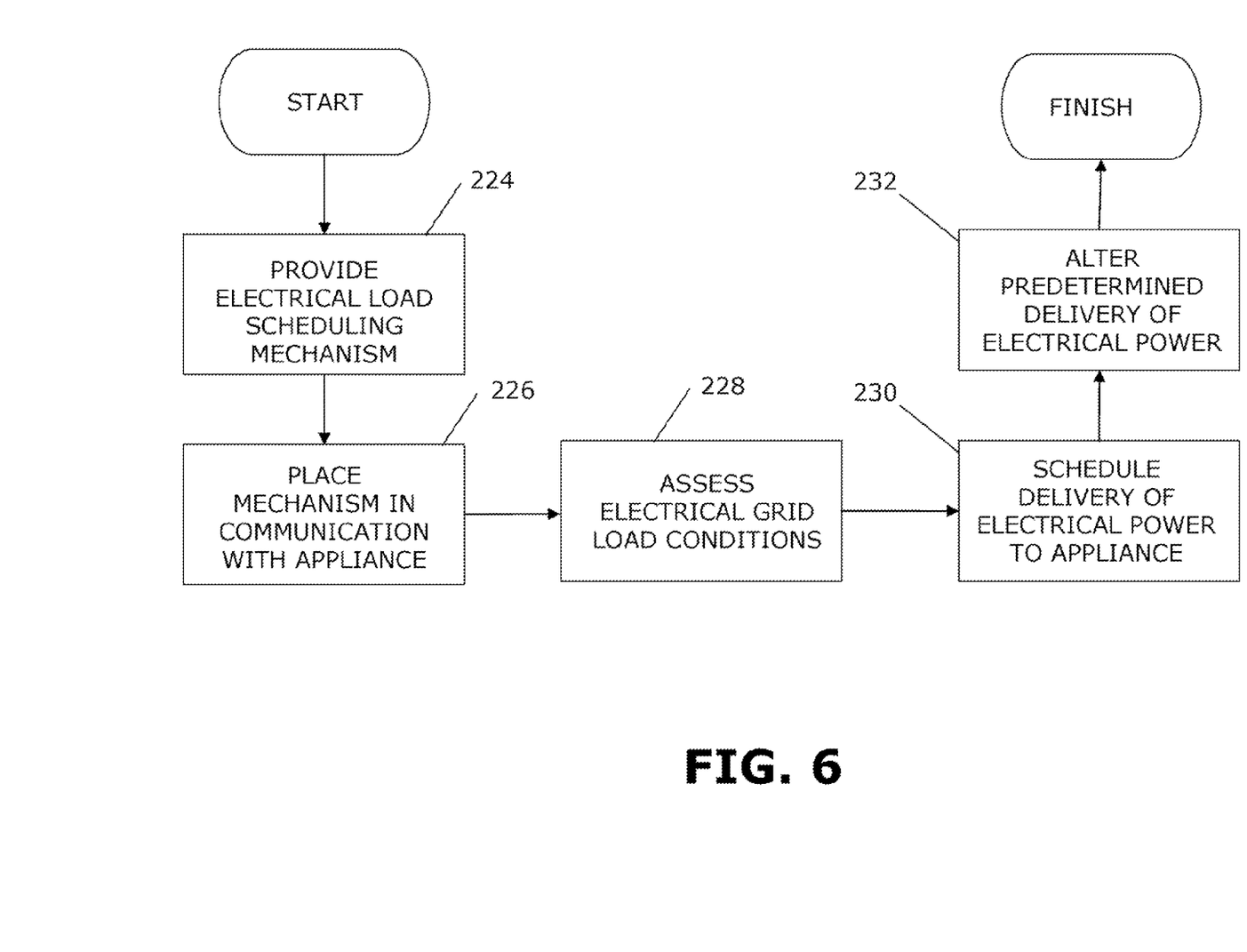
FIG. 6 sets forth a process more generally for load-shifting time deferrable devices.

FIG. 6 sets forth a process more generally for load-shifting time deferrable devices, in accordance with at least one embodiment of the invention. It should be appreciated that a process such as that broadly illustrated in FIG. 6 can be executed in its entirety on a microcontroller embedded in a plug (such as the plug 102 described and illustrated herein with respect to FIG. 2). The process may alternatively be carried out on essentially any suitable computer system or set of computer systems, which may, by way of an illustrative and on-restrictive example, include a system such as that indicated at 12' in FIG. 7. In accordance with an example embodiment, most if not all of the process steps discussed with respect to FIG. 6 can be performed by way a processing unit or units and system memory such as those indicated, respectively, at 16' and 28' in FIG. 7.

As shown in FIG. 6, in accordance with at least one embodiment of the invention, an electrical load scheduling mechanism is provided (224), and this is placed in communication with an appliance (226). Electrical grid load conditions are assessed (228), and delivery of electrical power to the appliance is scheduled via the electrical load scheduling mechanism (230). The scheduling includes deferring delivery of electrical power to the appliance from a peak load period to a non-peak load period based on the assessed electrical grid load conditions (232).

Figure 7:
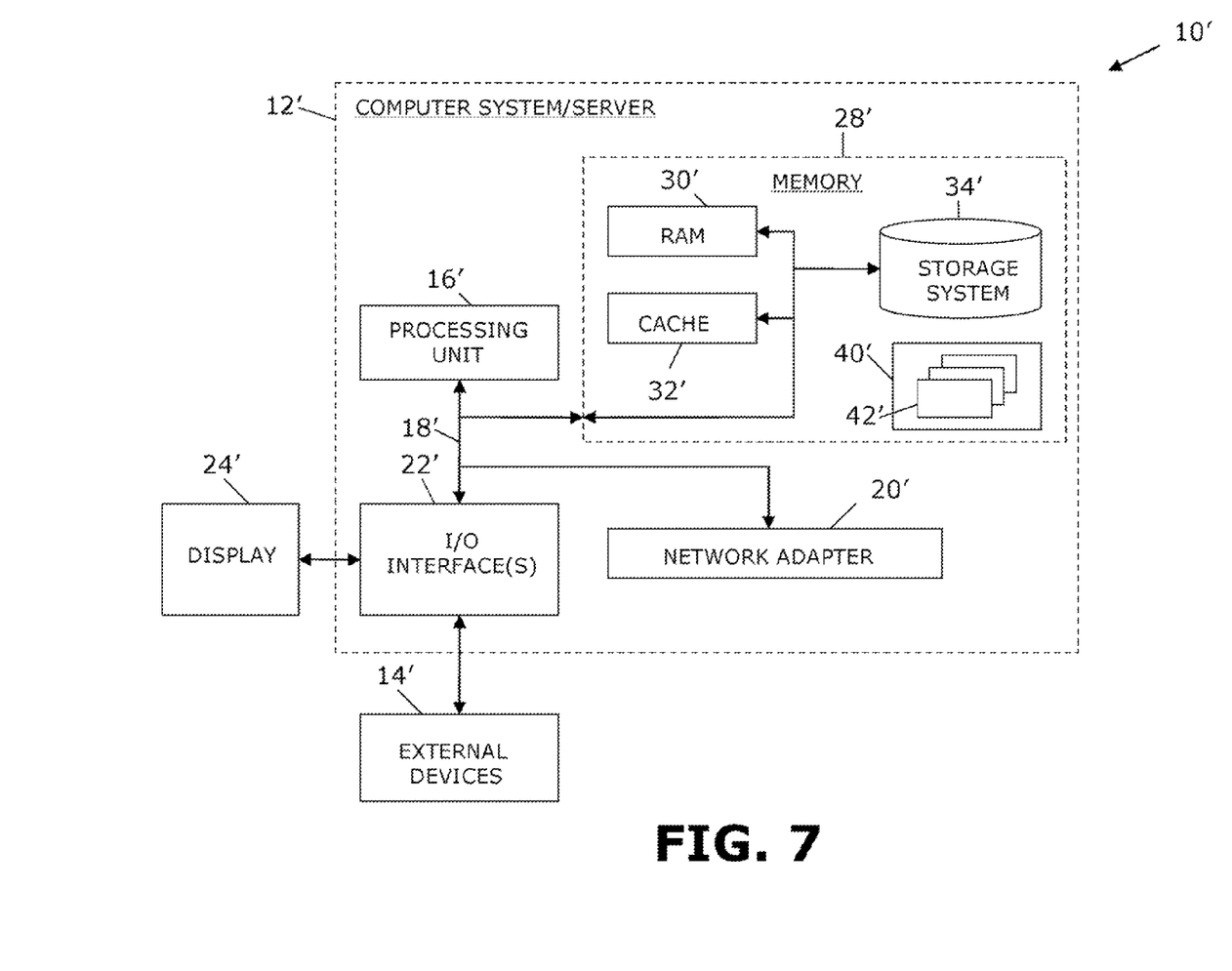
FIG. 7 illustrates a computer system for implementing aspects of the invention.

Referring now to FIG. 7, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node". Components of node 10', in the context of at least one embodiment of the invention, can also be included in a microcontroller embedded in a plug (such as the plug 102 described and illustrated with respect to FIG. 2).

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that is accessible by computer system/server 12', and it includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' by way of example, and not limitation, as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
   providing an electrical load scheduling mechanism;
   placing the electrical load scheduling mechanism in communication with an appliance;
   the electrical load scheduling mechanism comprising an object which is separable from the appliance and which transmits electrical power between an electrical grid and the appliance, wherein the appliance plugs into the electrical load scheduling mechanism and wherein the electrical load scheduling mechanism connects to the electrical grid;
   assessing electrical grid load conditions from the electrical load scheduling mechanism;
   accepting user input at a user interface of the electrical load scheduling mechanism, wherein said user input comprises at least one user-specified time constraint related to a time frame of delivery of electrical power to the appliance and user-specified time windows associated with at least one alternative energy source, wherein the at least one alternative energy source is different than the electrical grid; and
   scheduling delivery of electrical power to the appliance via the electrical load scheduling mechanism from the at least one alternative energy source;
   said scheduling comprising altering a predetermined delivery of electric power to the appliance based on the assessed electrical grid conditions and on the accepted user input.

2. The method according to claim 1, wherein said scheduling is performed solely with respect to the appliance with which the electrical load scheduling mechanism is in communication.

3. The method according to claim 1, wherein the object comprises a plug.

4. The method according to claim 1, wherein said altering comprises interrupting delivery of electrical power to the appliance responsive to grid imbalance.

5. The method according to claim 4, wherein the assessed electrical grid conditions include electrical grid line frequency.

6. The method according to claim 1, wherein said altering comprises rescheduling delivery of electrical power to the appliance from a peak load period to a non-peak load period based on assessed electrical grid load conditions.

7. The method according to claim 6, wherein the assessed electrical grid load conditions include electrical grid line voltage.

8. The method according to claim 6, wherein said rescheduling comprises rescheduling delivery of electrical power to a randomly determined time.

9. The method according to claim 1, wherein said altering comprises deferring delivery of electrical power responsive to a probabilistic determination of current grid capacity.

10. The method according to claim 1, wherein said altering comprises altering delivery of electrical power to the appliance based additionally on historical grid load patterns.

11. An apparatus comprising:
    at least one processor; and
    a computer readable storage medium having computer readable program code embodied therewith and executable by the at least one processor, the computer readable program code comprising:
    computer readable program code configured to accommodate an electrical load scheduling mechanism;
    computer readable program code configured to placing the electrical load scheduling mechanism in communication with an appliance;
    the electrical load scheduling mechanism comprising an object which is separable from the appliance and which transmits electrical power between an electrical grid and the appliance, wherein the appliance plugs into the electrical load scheduling mechanism and wherein the electrical load scheduling mechanism connects to the electrical grid;
    computer readable program code configured to assess electrical grid load conditions from the electrical load scheduling mechanism;
    computer readable program code configured to accept user input at a user interface of the electrical load scheduling mechanism, wherein said user input comprises at least one user-specified time constraint related to a time frame of delivery of electrical power to the appliance and user-specified time windows associated with at least one alternative energy source, wherein the at least one alternative energy source is different than the electrical grid;
    computer readable program code configured to schedule delivery of electrical power to the appliance via the electrical load scheduling mechanism from the at least one alternative energy source;
    computer readable program code configured to schedule via altering a predetermined delivery of electric power to the appliance based on the assessed electrical grid conditions and on the accepted user input; and
    computer readable program code configured to control, based on the computer readable program code configured to schedule, delivery of electrical power.

12. A computer program product comprising:
    a non-transitory computer readable storage medium having computer readable program code embodied therewith, the computer readable program code comprising:
    computer readable program code configured to accommodate an electrical load scheduling mechanism;
    computer readable program code configured to placing the electrical load scheduling mechanism in communication with an appliance;
    the electrical load scheduling mechanism comprising an object which is separable from the appliance and which transmits electrical power between an electrical grid and the appliance, wherein the appliance plugs into the electrical load scheduling mechanism and wherein the electrical load scheduling mechanism connects to the electrical grid;
    computer readable program code configured to assess electrical grid load conditions from the electrical load scheduling mechanism;
    computer readable program code configured to accept user input at a user interface of the electrical load scheduling mechanism, wherein said user input comprises at least one user-specified time constraint related to a time frame of delivery of electrical power to the appliance and user-specified time windows associated with at least one alternative energy source, wherein the at least one alternative energy source is different than the electrical grid;

computer readable program code configured to schedule delivery of electrical power to the appliance via the electrical load scheduling mechanism from the at least one alternative energy source;

computer readable program code configured to schedule via altering a predetermined delivery of electric power to the appliance based on the assessed electrical grid conditions and on the accepted user input; and computer readable program code configured to control, based on the computer readable program code configured to schedule, delivery of electrical power.

13. The computer program product according to claim 12, wherein said computer readable program code is configured to perform the scheduling solely with respect to the appliance with which the electrical load scheduling mechanism is in communication.

14. The computer program product according to claim 12, wherein the object comprises a plug.

15. The computer program product according to claim 12, wherein said computer readable program code is configured to interrupt delivery of electrical power to the appliance responsive to grid imbalance.

16. The computer program product according to claim 15, wherein the assessed electrical grid conditions include electrical grid line frequency.

17. The computer program product according to claim 12, wherein said computer readable program code is configured to reschedule delivery of electrical power to the appliance from a peak load period to a non-peak load period based on assessed electrical grid load conditions.

18. The computer program product according to claim 17, wherein the assessed electrical grid load conditions include electrical grid line voltage.

19. The computer program product according to claim 17, wherein said computer readable program code is configured to reschedule delivery of electrical power to a randomly determined time.

20. The computer program product according to claim 12, wherein said computer readable program code is configured to defer delivery of electrical power responsive to a probabilistic determination of current grid capacity.

21. The computer program product according to claim 12, wherein said computer readable program code is configured to alter delivery of electrical power to the appliance based additionally on historical grid load patterns.

* * * * *